Patented Jan. 6, 1942

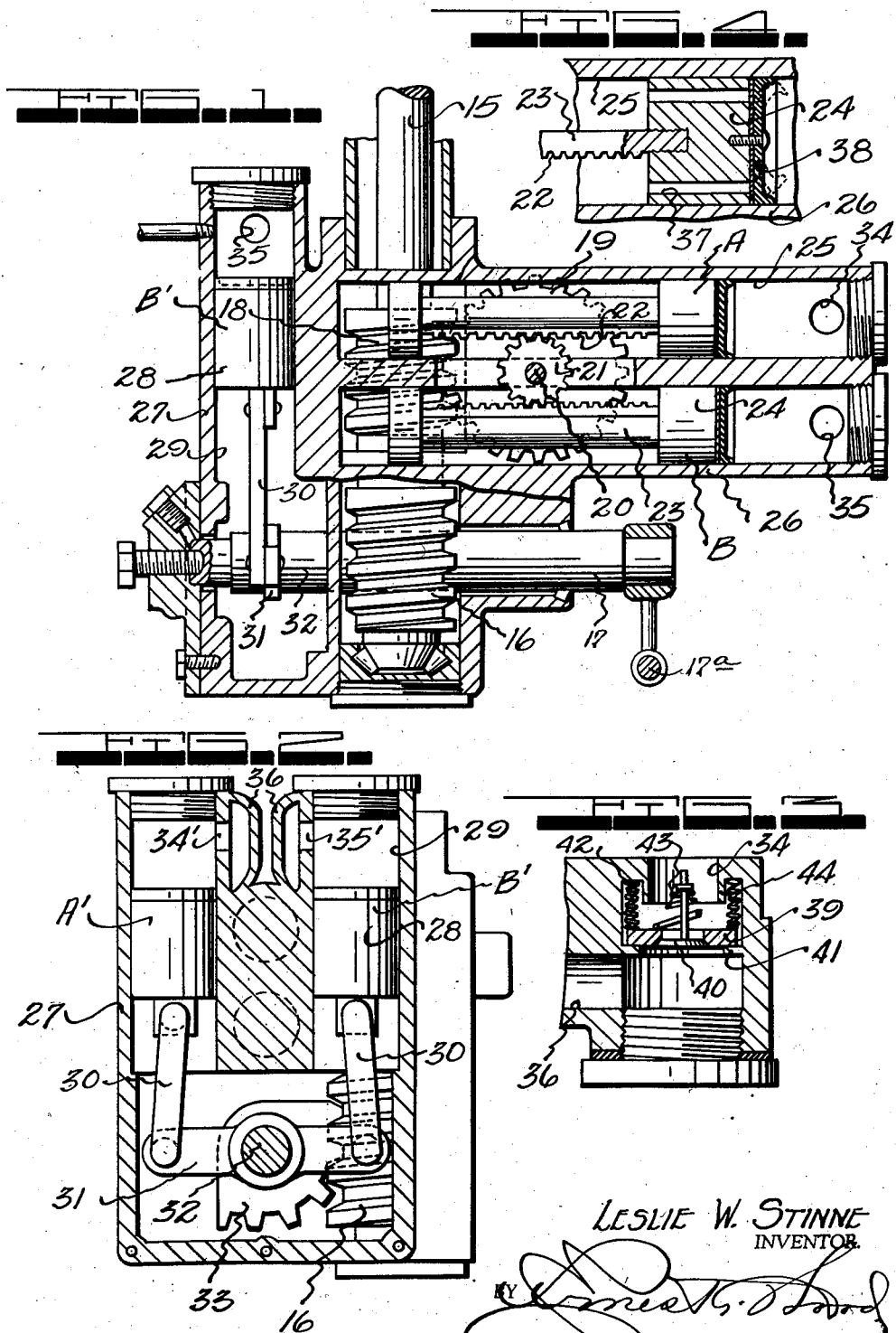
Jan. 6, 1942. L. W. STINNE 2,268,968
HYDRAULIC STEERING MECHANISM
Filed June 24, 1939
Leslie W. Stinne
INVENTOR
ATTORNEY.

2,268,968

UNITED STATES PATENT OFFICE 2,268,968

HYDRAULIC STEERING MECHANISM

Leslie W. Stinne, Wynne, Ark.

Application June 24, 1939, Serial No. 281,026

4 Claims. (Cl. 280—87)

This invention relates to new and useful improvements in hydraulic steering apparatus particularly adapted for use in the steering of automobiles, trucks and busses.

One object of the invention is to provide an hydraulic apparatus for the control of the steering mechanism of motor vehicles whereby the position of the steering mechanism is under the control of an operator at all times.

Another object of the invention is to provide in an hydraulic steering apparatus means whereby the wheels of a vehicle may be manually controlled in case of failure of any part of the hydraulically operated mechanism.

Still another object of the invention is to provide automatic steering apparatus which may or may not incorporate the mechanical movement and which may be operated by vacuum, air or hydraulic pressure.

Still another object of the invention is to provide a structure which may be made light in weight thereby allowing for adaptation to aircraft, and which may, when so desired, be fabricated to withstand heavy stresses such as are imposed, for example, on the steering mechanism of ships.

Yet another object is to provide an hydraulic steering mechanism having oppositely disposed pistons connected through linkages to the units to be moved, and control valve means positioned in such a manner that the assembly is constrained to move to a desired position and to remain in this position until manually changed by an operator.

Still another object of the invention is to provide valve means by which air may be readily bled from the system thereby insuring efficient operation under all conditions.

A construction designed to carry out the invention will be hereinafter described, together with other features of the invention.

The invention will be more readily understood from a reading of the following specification and by reference to the accompanying drawing, in which an example of the invention is shown, and wherein:

Figure 1 is a transverse, vertical, sectional view of a hydraulic steering apparatus constructed in accordance with the present invention.

Figure 2 is a vertical, sectional view taken at right angles to Figure 1.

Figure 3 is an enlarged detailed, sectional view of the safety valve.

Figure 4 is an enlarged sectional detail view of the bleeder valves in the primary pistons.

In the drawing, the numeral 15 designates the usual steering column, having the regular worm gear 16 at the lower end thereof, which gear rotates a shaft 17 connected to the drag link (17a) of the conventional steering apparatus.

A second worm gear 18 is fixedly mounted on the steering column or shaft, which gear is arranged to engage a circular gear 19 mounted on a shaft 20. A pinion gear 21 is also mounted on the shaft 20 and this pinion is so positioned as to mesh with gear racks 22 formed on the rods 23 of the primary pistons 24. These pistons are slidably confined within cylinders 25 formed in a housing 26 which housing is formed integral with a second housing 27.

By observing Figure 2 it may be seen that secondary pistons 28 are slidably confined within cylinders 29 formed within the housing 27. Pivoted connecting rods 30 are pivotally mounted on the lower end of said secondary pistons and are connected at the other ends to a crosshead 31 mounted on a horizontal shaft 32. This shaft 32 has mounted thereon a gear segment 33 which engages the usual worm gear 16.

Openings 34 and 35 formed in the cylinders 25 are connected by ports 36 to openings 34' and 35' formed in the cylinders 29. Fluid is introduced into the cylinders and as the shaft 15 is rotated both gears 16 and 18 will be revolved in such a manner as to cause the lower gear 16 to actuate the usual steering mechanism in the well known conventional manner while the gear 18 will move the primary pistons 24 due to its connection to the same through the medium of the gears 19 and 21, shaft 20 and gear rack 22.

By observing Figure 4 it may be seen that the primary pistons 24 are provided with ports 37 closed by cups 38, which cups on the down stroke, take the position shown in dotted lines in Figure 4 thereby allowing fluid to by-pass through said ports, which fluid serves also to lubricate the device, to pass through the ports 37 to the other side of that primary piston 24. On the up stroke, the cup 38 will assume the position shown in the full line of Figure 4 and thus force the fluid outwardly through the ports 34 or 35 as the case may be. It is to be noted that if the piston A is on the up stroke, the piston A' will be on the down stroke while at the same time the piston B will be on the down stroke and the piston B' will be on the up stroke thus forming a continuous double two cylinder cycle.

In Figure 3 a safety valve is shown, which valve is mounted in the openings 34 and 35. Between the opening 34 and the port 36 is positioned a circular valve 39 having corrugations around the outer periphery thereof, while a second valve 40 is centrally mounted in the circular member 39 and ordinarily retained in a seated position by a contraction coil spring 43. Thus pressure entering the port 36 from the opening 34 will cause the valve 40 to be opened to allow the pressure medium to by-pass the valve 39. The valve 39 is seated upon a shoulder 41 and ordinarily held in contact therewith by means of coil expansion springs 42. As pressure exhausts rather slowly, said pressure will raise the circular valve 39 off its seat 41 to allow pressure to return back through the port 34 by means of the peripheral corrugations. However, in the event that one wheel strikes a projection with great force, the tendency would be to produce a sudden rotation of the shaft 15, but as the fluid attempts to reach the ports 34 under pressure of the wheel shock the circular valve 39 would be raised against tension of springs 42 to seat itself against a downwardly depending collar 44 to prohibit passage of fluid from the port 36 to the opening 34. This action will cause the pistons A' and B' to remain in the same position thereby eliminating any sway from being transmitted to the vehicle being controlled. The importance of this valve is to be particularly noted especially in instances when curbings or traffic buttons are accidentally hit by a motor vehicle. This valve will prevent any unexpected turns or shocks to the steering wheel of the vehicle. It is to be noted that in this type steering apparatus hydraulic pressure is created manually by means of the pistons A and B and also that the fluid used is caused to continuously recirculate in the system, whereby said fluid will not only lubricate all moving parts but also act as a hydraulic fluid upon the pistons A' and B'.

Thus it will be seen that the operator need not manually turn the wheels of the vehicle but need only turn the shaft to such an extent as to allow the worm gear 16 to move in such a manner as to allow the hydraulic pressure to move the gear segment, which segment will actuate the worm to turn the wheels of said vehicle. In other words the gear segment bears against the worm with sufficient pressure whereby the operator need only rotate the shaft 15 to turn the worm gear 16 sufficiently to allow free movement of the gear segment in mesh with said worm gear.

From the foregoing it may be seen that hydraulic steering mechanisms may be had, which mechanisms may employ an auxiliary fluid pressure or which may have a pressure producing apparatus formed integral therewith but at all times in case of failure of any part of the hydraulic system, the usual manual operation of the steering mechanism may be had in the usual manner. Also the hydraulic units hereinbefore described are used as an auxiliary booster while the primary movement of the wheels is had in the usual manner. Also safety valves are provided which valves will eliminate unexpected turns of the vehicle due to the striking of objects, blowouts or like mishaps due to occur during the operation and travel of a motor vehicle. The hereinbefore described mechanisms are comparatively simple and sturdy in construction and positive in action and so arranged as to eliminate any unnecessary fluid lines as all communicating ports are formed integral with the device.

It is to be noted that if desired vacuum could be used as a means for actuating the pistons instead of hydraulic fluid. If this were done, the foregoing descriptions of operation would be the exact opposite to those operations hereabove.

Manifestly, the cnstruction as shown and described is capable of some modification and such modification as may be construed within the scope and meaning of the appended claims is also considered to be within the spirit and intent of the invention.

What is claimed is:

1. An hydraulic steering apparatus including a steering column, a worm gear keyed on the lower end of said column, means connecting said worm gear to the drag link of a vehicle steering unit, a second worm gear keyed on said column and in mesh with a circular gear, a horizontal shaft for retaining said circular gear, a pinion gear mounted on said horizontal shaft, a pair of primary pistons slidably mounted in cylinders, piston rods having gear racks formed thereon and arranged to mesh with said pinion gear whereby rotation of said second worm gear will effect opposite movement of said primary pistons, a pair of secondary pistons mounted within cylinders, fluid conduits connecting said primary and said secondary cylinders, a cross-head, rods connecting the ends of said cross-head to respective secondary pistons, and means actuated by said cross-head through said secondary pistons for resisting rotation of said first worm gear.

2. An hydraulic steering aparatus as set forth in claim 1 in which the primary pistons are provided with bleeder valves to effect recirculation of fluid, and safety valves mounted in the conduit adjacent the primary cylinders whereby shocks will not be transmitted to the steering column.

3. An hydraulic steering apparatus including a housing, a steering shaft entering said housing, a worm gear fixedly secured to said shaft within said housing, said worm gear being arranged to actuate the drag link of a steering unit, a pair of cylinders, pistons slidable in said cylinders, a second worm gear carried by said steering shaft, parallel gear racks connected to said pistons, a gear driven by said second worm gear to actuate said pistons through said gear racks, a second pair of cylinders containing pistons, means for actuating said latter pistons by pressure transmitted alternately by said first pistons, means operated by said latter pistons to control the rotation of said first worm gear to facilitate the actuation of said drag link, and spring controlled valve means in the pressure transmission between the two pairs of cylinders for resisting sudden introduction of pressure into said first cylinders when said drag link is subjected to unwanted shocks.

4. In a steering apparatus, a housing into which the steering post of a vehicle extends, a primary pair of cylinders in said housing, pistons therein, a worm, worm gear and pinion operated by said steering post, gear racks forming the rods of said pistons and enmeshing said pinion for effecting simultaneous movement of said pistons in their cylinders in opposite directions as said post is rotated, a second pair of cylinders having fluid connection with said first cylinders, pistons therein, a worm carried also by said steering post adapted to impart movement to the drag link of a vehicle, means operatively joined to said latter pistons and connected with said worm to control the movements of the latter as said pistons are actuated and means in the fluid connection between said cylinders to maintain normal exchange of fluid and effective to resist sudden passage thereof into said first cylinders when said drag link is subjected to unusual shocks.

LESLIE W. STINNE.